April 25, 1933.   P. PASCHEN ET AL   1,906,089
MEASURING INSTRUMENT
Filed May 19, 1930   4 Sheets-Sheet 1

April 25, 1933.　　P. PASCHEN ET AL　　1,906,089
MEASURING INSTRUMENT
Filed May 19, 1930　　4 Sheets-Sheet 2

April 25, 1933.   P. PASCHEN ET AL   1,906,089
MEASURING INSTRUMENT
Filed May 19, 1930   4 Sheets-Sheet 4

Patented Apr. 25, 1933

1,906,089

UNITED STATES PATENT OFFICE

PAUL PASCHEN AND GEORG MOHR, OF NUREMBERG, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

MEASURING INSTRUMENT

Application filed May 19, 1930, Serial No. 453,561, and in Germany May 23, 1929.

Our invention relates to metering instruments. The cumbersome reading of gas, electricity meters and similar commodities, may be avoided by making use of a known proposal of combining the metering instruments with printing devices which print the reading of the counter or straightway a receipt. Printing devices of that kind have also been proposed for periodically recording measuring instruments to avoid the complex working out of the diagrams. Printing devices of that kind have, however, up to the present not found favor in the market, because they have various shortcomings when working continuously. For instance, after a short time, the printing types become dirty, so that the impressions become illegible, and the frictional resistances of the types operated by the metering instruments increase. The storing of the printing-ink in the metering arrangement and the feed of the ink to the printing types also causes very great difficulties. It is also inconvenient that the store of ink must from time to time be renewed, for which purpose the metering instrument must be opened. There is also the danger that by erasing or overprinting the impressions could be falsified. A further imperfection of devices of that kind resides in the necessity of making the type-carriers as well as their supporting and driving parts comparatively strong to enable them to resist the repeated printing pressure; and another disadvantage is that the power of the measuring instrument is scarcely sufficient to operate the type-carriers. If one wanted to punch the figures instead of printing them, the type-carriers would be still more stressed. Besides the punches forming the figures, corresponding dies would have to be provided, which would have to be operated in the same way as the type-carriers and brought into registry with the carriers. There would also exist the danger that the waste and the dust, inevitably produced when punching, clogs the metering instrument; the waste from punching would also from time to time have to be removed.

The invention has as its object to provide a printing device, particularly for metering instruments, which is free from the aforementioned faults. Particularly, the load which it puts on the metering instruments is so small, that only a comparatively small power is required to operate it. A falsification of the impressions is impossible or at least easily detectible. The printing device can operate a long time without requiring any attendance, and the types are light in weight and cheap to manufacture.

According to the invention, the impressions are produced by a rubbing action in such a manner that a paper chart, preferably with a prepared writing surface as known in the silver stylus writing apparatus for indicators, is laid over the raised or hollow types and that a friction body passes over the types.

By this sliding action the friction body slightly wears off and leaves, for instance, dark marks on the white paper surface at the places where the raised parts of the types are located, or a dark grounded paper, provided with a light colored coating may be employed, from which the friction body removes at the raised places of the types the light coating. As experience shows, impressions of that kind are difficult to falsify, or it is at least easy to discover the fraud immediately. To make falsifying more difficult a screen design may be printed on the writing surface.

The invention is illustrated in the accompanying drawings, which show forms in which the invention may be reduced to practice. In these drawings.

Figure 1:
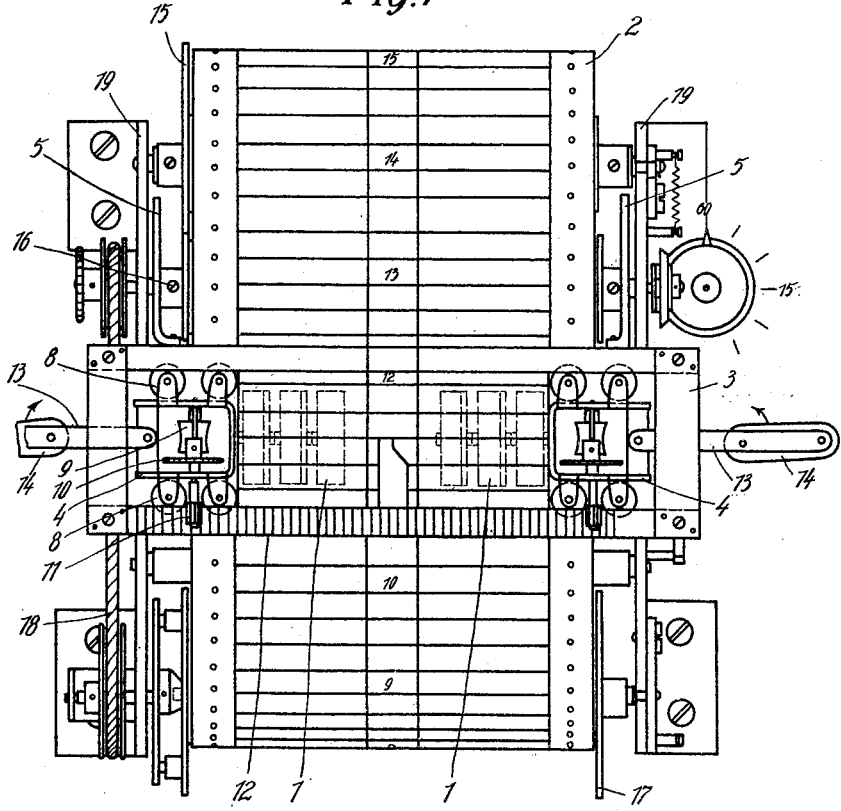
Fig. 1 represents a front and
Fig. 2 represents a side elevation of one form of printing device.

The invention will now be explained with reference to the example shown in Figs. 1 to 3, the printing device proper being considered in the first place.

The raised figures on the counter disks 1 serve as types. The paper chart 2 with the prepared outer writing surface passes over the numerals on these disks. In front of the paper chart is arranged the transverse guiding frame 3 for the carriages 4. The guiding frame is fastened to the arms 5, which can swing on the pivots 6, and is pressed toward the writing surface by the spring 7.

Figure 2:
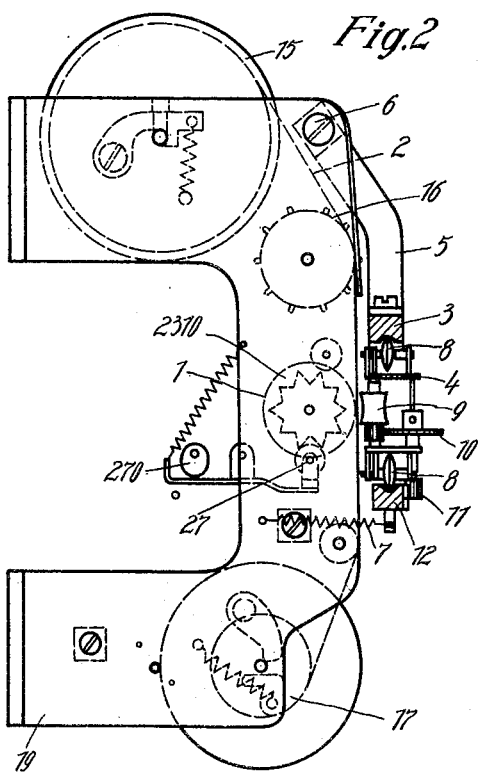

In each carriage 4, which runs on the rollers 8 in the groove of the guiding frame 3, is mounted a friction body in the form of a roller 9, the peripheral contour of which, in the direction of the roller axis, is adapted to the peripheral curvature of the numeral disks as clearly appears in Fig. 2. The friction roller is geared through a step-up gear 10 to the pinion 11, which engages a rack 12 fixed to one length side of the carriage frame 3. As clearly appears from Figs. 1 and 3, both carriages are operated in similar manner, and accordingly the operating mechanism of only one carriage, (left in Fig. 1) is described in the following. The carriage 4 is connected by the link 13, Figures 1 and 3 to the crank 14, which rotates during the act of printing.

When the crank 14 rotates, the carriage 4 goes backwards and forwards, the friction body 9 rubs during this movement against the horizontal row of types presented by the counter 1, which is in printing position, the friction body being at the same time driven, as described, in a direction in which its periphery near the paper moves contrary to the carriage movement. The friction body 9 which is made of silver or of another coloring metal or of an alloy, blackens the paper chart at the places where the figures are. As practice shows, extremely little of the friction body is worn off in doing so.

A particular advantage with the above form of construction is that the carriage 4 in the shown position of rest of the printing device leaves the front of the printing surface free so that the printed figures may be easily read. This is obtained by disposing the one dead center of the crank mechanism 13, 14 in such a manner that the carriage normally clears the counter 1. During the act of printing, the friction body is pressed by the spring 7, through the means of the guiding frame 3 and of the carriage 4, softly against the surface of the paper. It is an advantage to groove the surface of the friction body in a direction slanting with respect to the direction of its rotation or to roughen it in any other suitable manner. The guiding frame 3 may, after the spring 7 and the crank connection 13, 14 have been loosened, be turned upward on its pivots 6, the paper chart is then accessible for removal.

The paper chart runs off the braked paper chart roller 15, and is driven through a clock work in the known manner by means of the pin drums 16, engaging in perforations provided near either edge of the chart. The chart is reeled, after printing on to the drum 17. This drum is driven by the rope drive 18 acting at the same time as a slip clutch, the ratio of transmission being such as will tend to drive drum 17 at slightly higher speed. The paper chart is consequently always stretched. The following is, with reference to the operating power flow diagram of the mechanism in Figure 4, an explanation of the system of the transmission gears and of the mode of operation of the printing device. In the diagram the reference numerals are the same as appear in Figs. 1 to 3 for similar elements, the direction in which the driving power flows being indicated by arrows.

The electricity meter 20 drives through the power transmission 21 the planetary shaft 22 of a differential gear, the sun wheel 23 of the latter being coupled, through the slip clutch 230, to the counting mechanism 231 carrying a counter 1, and the sun wheel 24 of the differential gear being coupled through the slip clutch 240 to the counting mechanism 241 carrying another counter 1. The sun wheels 23, 24 can be alternately stopped by the locking member 25 so that only one of the counting mechanisms can be driven at a time by the meter 20. On to the halves of the slip clutch 230, 240 connected to the counters are connected, at the top of the shafts 232, 242 the reversing wheels 233, 243 which can be alternately coupled to the reversing mechanism 26. The coupling is effected by means of the adjusting part 260, which in the example of Figure 3 is combined with the locking member 25 and in the diagram of Fig. 4 is coupled through the shaft 265 to the locking member 25. The part 26 of the resetting-to-zero mechanism, which may mesh with the one wheel or the other is connected through the shaft 261, with one sun wheel 35 of a differential gear, the planetary wheel 34 of which is driven through the power transmission 33 from the straining mechanism 32, which consists of a spring, a spring housing and a spring arbor. The straining mechanism 32 is, through the power transmission 31, wound up periodically or rewound each time to the amount it is run down, by a small motor 30 which, as shown, applies its power to the spring housing. The straining mechanism has a reserve of power sufficient to operate the printing device several times even if the current supply for the motor 30 should fail.

Figure 3:
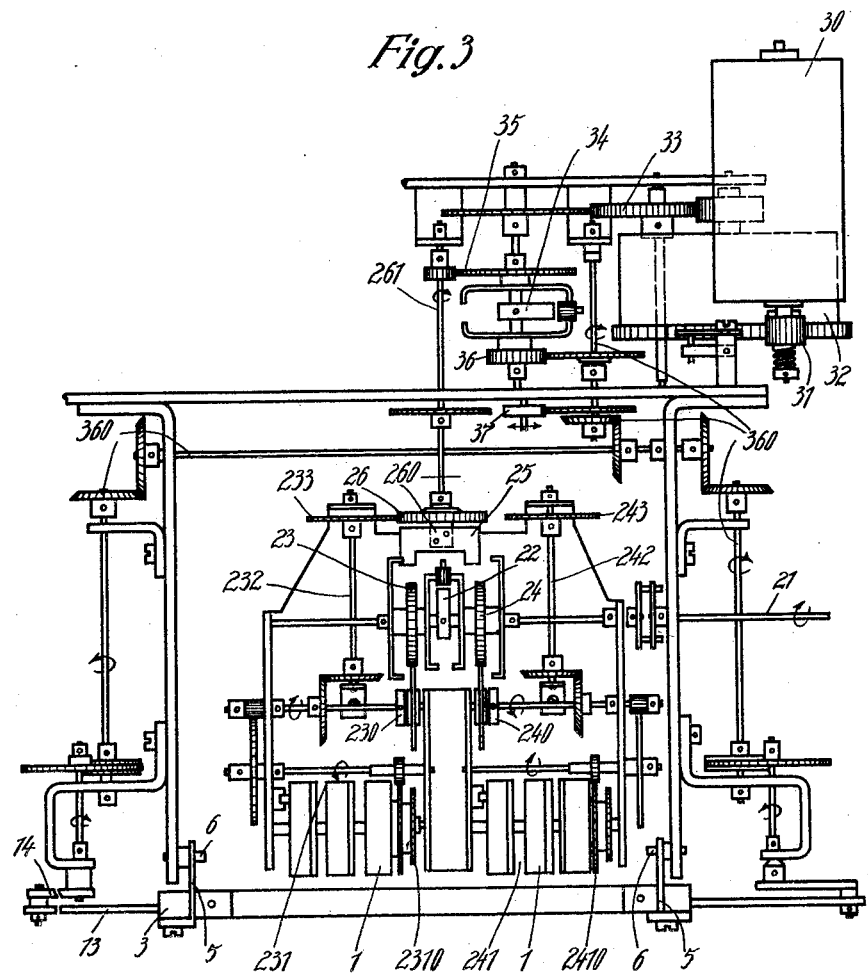
Fig. 3 represents a plan view of the driving mechanism for the printing device.
Figure 4:
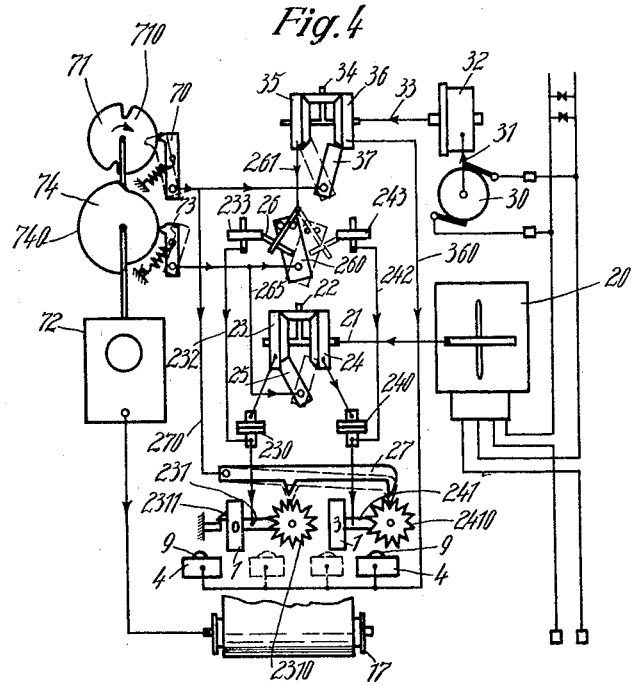
Fig. 4 represents a power diagram of the printing mechanism showing the way in which the energies for setting and operating the printing mechanism flow through the device.

The other sun wheel 36 of the differential gear is coupled through the power transmission 260 to the driving arrangement, cranks, 14 etc., Figure 3, for the carriages 4, which carry the friction bodies 9, as described before. The movement of the sun wheels 35, 36 may be alternately stopped by the locking member 37.

With the counting mechanisms 231, 241 are connected notched disks 2310 and 2410 respectively which are set in such a manner by the operation of the adjusting device 27, each time before printing takes place, that the last decimal of the counter is properly alined into printing position.

The adjusting device 27 is coupled through the power transmission 270, represented in the constructional form Figure 2 as an eccentric, to the locking member 37. Both parts are controlled, through the control lever 70 and the cam 71, from the clockwork 72, which also controls the parts 260 and 25 through the control lever 73 and the cam 74. The working of the device is as follows:

In the position shown in full lines, the meter 20 drives the counter 241; the counter 231 having just before been turned back by the reversing mechanism 26 until it reaches the zero position at the stop 2311. After a certain time, the notch 710 of the disk 71 encounters the controlling part 70, which when it engages notch 710 assumes under the influence of a spring the position shown by dash lines. The parts 37 and 27 are thereby also brought into the dashed position. The counter 241 is thereby set to a whole number and held there. The straining mechanism 32 now drives the printing device 4, 9 through the parts 33, 34, 36, 360. At the counter 231 is printed the zero value and at the counter 241 the prevailing metering value in the manner described. The carriages 4 carry out a backwards and forwards movement, until finally the controlling member 70 leaves the notch 710 and the sun wheel is held by the part 37. At the same time the part 27 again releases the notched disks 2310, 2410. Also at the same time, or shortly afterwards, the half 740 of the disk 47 with the larger diameter meets the control lever 73 and the parts 25 and 260 are brought into the position shown by the dash lines. The meter 20 is thereby changed over from driving the counter 241 to driving the counter 231, and inversely the reversing mechanism 26 is changed over from the counter 231 to the counter 241 turning the latter back until it reaches the zero position at a stop (not shown in Fig. 4).

During this movement the clutch 240 slips because the sun wheel 24 is locked by the part 25. Now, a new recording period begins, during which the consumption is recorded on the counter 231, whilst the counter 241 remains in the zero position. At the end of the recording period the printing device is again released. Now, the end position of the counter 231 and the zero position of the counter 241 is printed, and so on. The zero position is printed in order to be able to check whether the individual counters have really been reset to zero. This control is important, because if the counters are not reset quite back to zero, the amount recorded, which is charged to the consumer, would be increased by the difference. The consumer would therefore have to pay too much. If for some reason or other the zero position has not been reached, the difference is printed and can easily be deducted from the recorded amount for the following period.

It would also be possible to replace the change-over clutch between the parts 26, 233, 243 by a differential gear with a locking member. The device shown is, however, more advantageous, because the load on the meter 20 is thus lighter, as the parts 233 and 243 can, when uncoupled, move freely and are not,—as is the case when a differential gear is used—connected by means of a slip clutch, always acting as a brake, to the locked part of the differential gear.

In the constructional example, shown in Figs. 1 and 2 the whole printing device rests on a separate bridge-like frame 19, which may easily be placed over the supporting frame for the remaining parts of the mechanism shown in Fig. 3. This arrangement is of eminent importance for the mass production of the apparatus and for its operation, because both mechanisms may be separately assembled, renewed and inspected. It is advisable to provide the paper chart 2 for a whole year or a substantial part of the year with consecutive numbers or other ordinal characters of one or more colors for the record charts, in order to be able to determine, after the chart is printed, the time at which each individual record has been taken.

Figure 5:
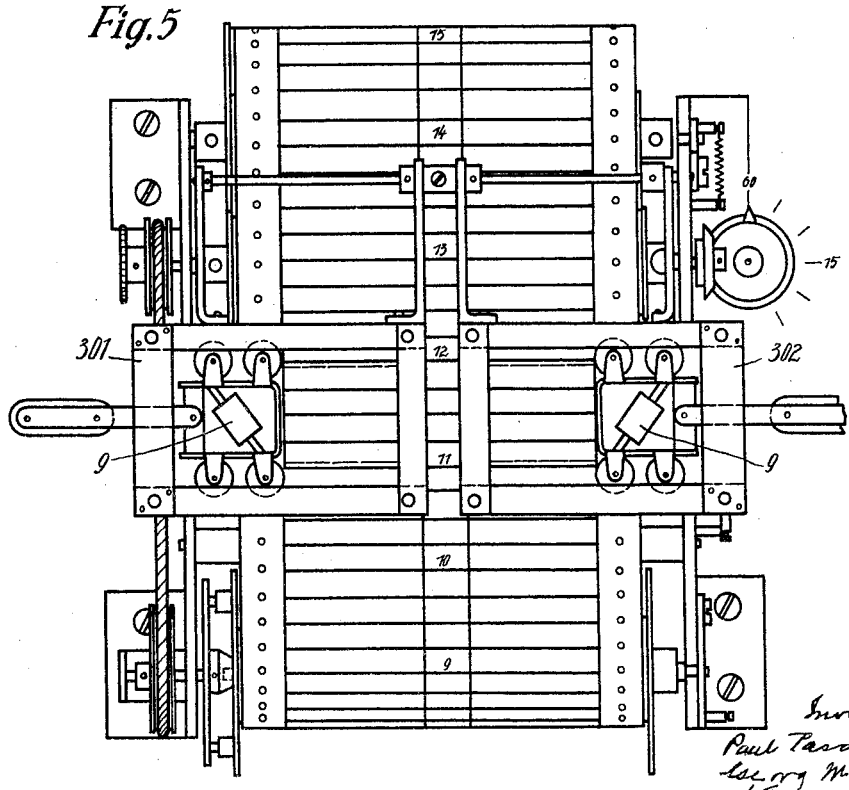
Fig. 5 represents a front elevation, similar to Fig. 1 of a modification of the form shown in Figs. 1 to 3.

In Figure 5, the guiding frame for the carriages has been subdivided into two halves 301 and 302. The tooth gear drive of Figures 1 and 2 for the friction body 9 has been omitted, and instead, the axis of the friction body 9 has been placed in a position slanting with respect to the direction of the movement of the carriage. During the movement of the carriage, the friction body performs a combined sliding and rotating movement with respect to the writing surface.

We claim as our invention:

1. In a metering and recording instrument, a printing device, comprising types arranged on the one side of the sheet to be printed upon, a friction body arranged on the other side of said sheet, means suitable for moving the friction body under pressure against the sheet and with a sliding movement along the part of the sheet covering the types to be printed, for producing an imprint thereof on said other side of the sheet by abrasion due to the friction between the sheet surface and the friction body.

2. In a metering and recording instrument, a printing device, comprising movable types, arranged on the one side of the chart to be printed upon, and being driven from the metering instrument to move the desired types into printing position, a friction body made of soft metal, such as silver, arranged on the other side of said chart, means suitable for moving the friction body under pressure against the chart and with a sliding movement along the part of the chart covering the types in printing position, whereby the friction body discolors the chart at the places raised by the contour of the types.

3. In a metering and recording instrument, a printing device comprising a set of type wheels, arranged on one side of the chart to be printed upon, and operable by said metering instrument to move the desired types into printing position, a drum-shaped friction body arranged on the other side of said chart, and means suitable for moving the friction body under pressure against the chart and with a sliding movement along the part of the chart covering the types in printing position, for producing an imprint thereof on said other side of the chart by abrasion due to the friction between said body and the chart surface.

4. In a metering and recording instrument, a printing device, comprising type wheels arranged on the side of the chart to be printed upon and being driven from the metering instrument, a drum-shaped friction body with roughened surface, arranged on the other side of said chart, and means suitable for moving the friction body under pressure against the chart and with a sliding movement along the part of the chart covering the types, for producing an imprint thereof on said other side of the chart by abrasion due to the friction between said body and the chart surface.

5. In a metering and recording instrument, a printing device, comprising a set of type wheels, arranged on one side of the chart to be printed upon and being driven from the metering instrument to move the desired types into printing position, a guide frame arranged at least approximately in parallel to the row of types in printing position and to the chart surface, a carriage movably mounted in said frame, a friction body on said carriage, means suitable for reciprocating said carriage in said frame, and means for pressing said friction body against the front of the chart portion covering the types in printing position, whereby said friction body slides over said chart portion and reproduces on the outside chart surface the contour of the types in printing position by abrasion due to the friction between said friction body and the outside chart surface.

6. In a metering and recording instrument, a printing device, comprising a set of type wheels, arranged on the one side of the chart to be printed upon and being driven from the metering instrument to move the desired types into printing position, a guide frame arranged at least approximately in parallel to the row of types in printing position and to the chart surface, a carriage movably mounted in said frame, a drum-shaped friction body rotatably mounted in said carriage, means for pressing said friction body against the part of the chart covering the types in printing position, and means for reciprocating said carriage to reproduce on the outside chart surface by body friction the contours of said types.

7. In a metering and recording instrument, a printing device, comprising a set of type wheels, arranged on the one side of the chart to be printed upon, and being driven from the metering instrument to move the desired types into printing position, a guide frame arranged at least approximately in parallel to the row of types in printing position and to said chart, a carriage movably mounted in said frame, a drum-shaped friction body rotatably mounted in said carriage, and having its axis of rotation arranged in parallel to the chart, but slantingly with respect to the direction of carriage movement, means for pressing the friction body against the chart portion covering the types in printing position, and means for reciprocating said carriage, to reproduce on the outside chart surface by body friction the contours of said types.

8. In a metering and recording instrument, a printing device comprising a set of type wheels, arranged at the back of the chart to be printed upon and operable by the metering instrument to move the desired types into printing position, a guide frame, arranged at the front of said chart, at least approximately in parallel to the row of types to be printed and to the surface of the paper, a carriage movably disposed in said frame, and a rack fixed on said frame along the carriage path, a drum-shaped friction body rotatably mounted in said carriage, and means for pressing said body against the chart, a gear drive for said friction body including a pinion in mesh with said rack for rotating said body in said carriage and on said chart surface against the direction of carriage movement, and means for reciprocating said carriage in said frame, to reproduce on the outside chart surface by friction the contours of the types in printing position.

9. In a metering and recording instrument, a printing device comprising a set of type wheels, driven from the metering instrument to move the desired types into printing position and being arranged at the back of the chart to be printed upon, a guide frame arranged on the front side of said chart, at least approximately in parallel to the row of types to be printed and to the surface of the chart, means for pivoting said frame on an axis sufficiently removed from the printing line, to permit the swinging of the frame away from the chart, and a spring for normally drawing said frame toward the chart, a carriage movably disposed in said frame, a friction body rotatably mounted in said carriage and contacting with the chart surface, and means for reciprocating said carriage in said frame, to move said body over the chart surface, for frictionally reproducing the contours of the types in printing position.

10. In a metering and recording instrument, a printing device, comprising a set of type wheels, arranged on the one side of the chart to be printed upon and being driven from the metering instrument to move the desired types into printing position, a guide frame arranged at least approximately in parallel to the row of types in printing position and to the chart surface, a carriage movably mounted in said frame, a drum-shaped friction body rotatably mounted in said carriage, means for pressing said friction body against the part of the chart covering the types in printing position, and a crank drive for reciprocating said carriage to reproduce on the outside chart surface by body friction the contours of the types in printing position, said drive being disposed with reference to the printing line on the chart so as to locate the carriage in either dead center position of the crank drive laterally of the printing line to clear the latter for observation, and a locking device for holding said crank drive in dead center position when the printing is completed.

11. In a recording device for metered values, a metering device, a first frame containing a counter having type wheels and being operated by said metering device, a printing device comprising a bridge-shaped frame and carrying at its two ends a full and an empty paper reel respectively and means for driving said reels to move the paper past said type wheels, a slide frame pivotally mounted on said printing frame so as to be movable at right angles to the paper surface, a spring for pressing said guide frame toward the paper, a carriage slidably mounted in said guide frame to move in parallel to the row of type of said counter, a friction body rotatably mounted on said carriage and being pressed by said spring against the paper where it contacts with said type wheels, means for reciprocating said carriage along the row of type wheels to wipe said body over the paper to reproduce the types located beneath the paper, a clockwork for driving the reel drive for said paper, and a power drive for reciprocating said carriage.

In testimony whereof we affix our signature.

PAUL PASCHEN.
GEORG MOHR.